(12) United States Patent  (10) Patent No.: US 7,120,788 B2
Ramirez  (45) Date of Patent: Oct. 10, 2006

(54) METHOD AND SYSTEM FOR SHUTTING DOWN AND RESTARTING A COMPUTER SYSTEM

(75) Inventor: Nick Ramirez, Gilbert, AZ (US)

(73) Assignee: Intel Corporation, Santa Clara, CA (US)

(*) Notice: Subject to any disclaimer, the term of this patent is extended or adjusted under 35 U.S.C. 154(b) by 524 days.

(21) Appl. No.: 10/174,814

(22) Filed: Jun. 20, 2002

(65) Prior Publication Data

US 2003/0237007 A1  Dec. 25, 2003

(51) Int. Cl.
*G06F 1/24* (2006.01)
*G06F 9/00* (2006.01)

(52) U.S. Cl. .......................................... 713/100; 713/1

(58) Field of Classification Search .................... 713/1, 713/2, 100; 361/801; 710/300–304
See application file for complete search history.

(56) References Cited

U.S. PATENT DOCUMENTS

| | | | | |
|---|---|---|---|---|
| 4,823,021 A | * | 4/1989 | Shimada et al. | 307/112 |
| 5,357,626 A | * | 10/1994 | Johnson et al. | 714/33 |
| 5,604,875 A | * | 2/1997 | Munce et al. | 710/316 |
| RE36,381 E | * | 11/1999 | Boyle et al. | 361/686 |
| 6,003,131 A | * | 12/1999 | Lee et al. | 713/2 |
| 6,272,642 B1 | * | 8/2001 | Pole et al. | 713/300 |

OTHER PUBLICATIONS

"Firmbase® Technology", General Software site, http://www.gensw.com/pages/prod/firmbase/firmbase.htm, May 2005.

* cited by examiner

*Primary Examiner*—Rehana Perveen
*Assistant Examiner*—Trisha Vu
(74) *Attorney, Agent, or Firm*—Grossman, Tucker, Perreault & Pfleger, PLLC

(57) ABSTRACT

Embodiments of the present invention provide a method and system for shutting down and restarting a computer system. A processor interrupt may be generated in response to the activation of a mechanical switch on a removable processor board. The processor may be switched from a first operating mode to a second operating mode in response, and the cause of the processor interrupt may be determined. The processor may then be switched from the second operating mode back to the first operating mode, and a software component executing within the first operating mode may be notified to shut down. According to another aspect of the invention, performance information may be periodically stored in a memory. A processor interrupt may be generated in response to a system anomaly, and the operating mode of the processor may be switched from a first mode to a second mode. Based on the performance information, the system may be restarted, or, alternatively, a component within the system may be restarted or replaced.

17 Claims, 3 Drawing Sheets

100

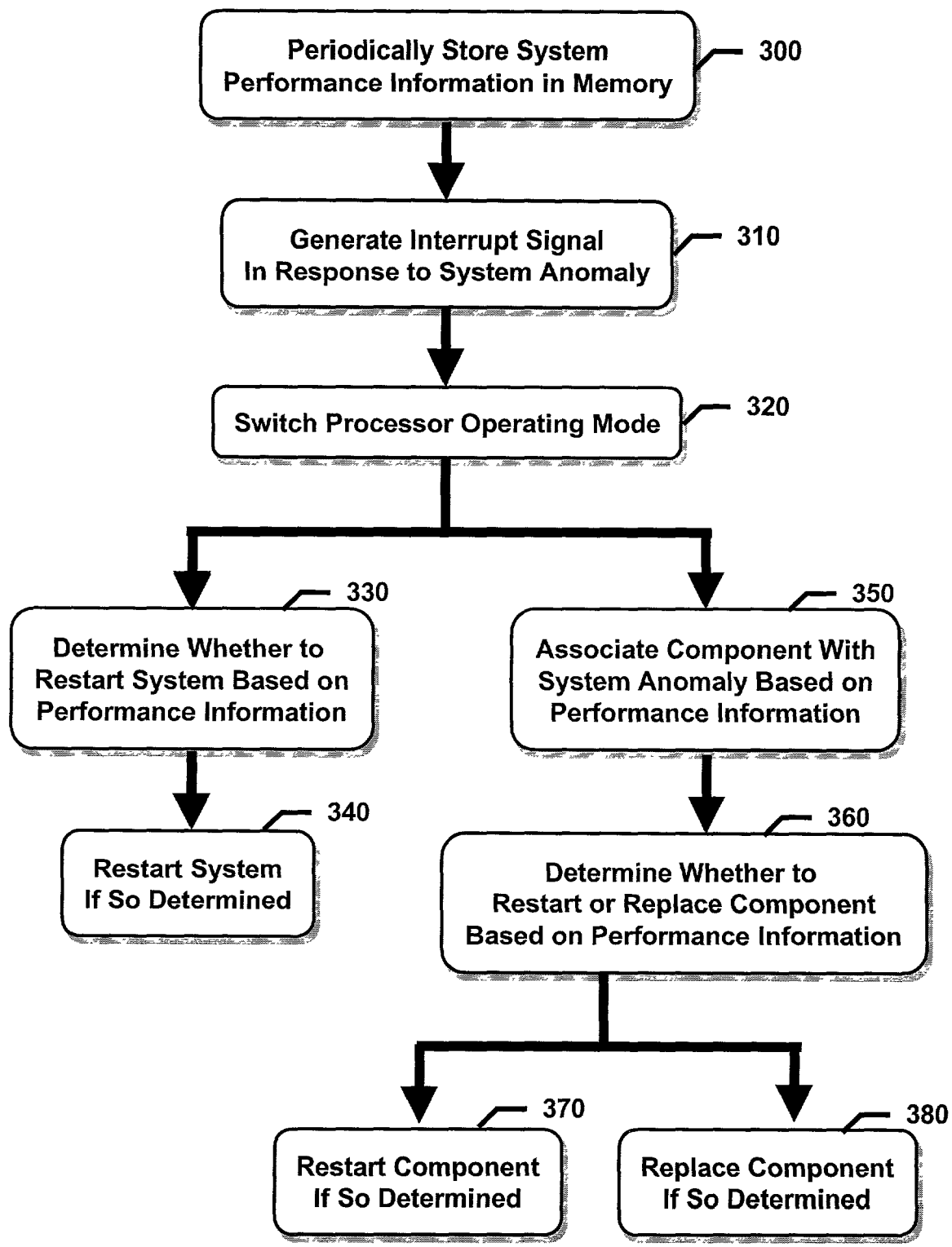

METHOD AND SYSTEM FOR SHUTTING DOWN AND RESTARTING A COMPUTER SYSTEM

TECHNICAL FIELD

The present invention relates to computer systems. More specifically, the present invention relates to a method and system for shutting down and restarting a computer system.

BACKGROUND OF THE INVENTION

A computer system generally consists of several basic components, including a central processor, volatile and non-volatile memory, and various peripheral devices, including graphics controller(s), mass storage devices, network interface device(s), input/output devices, etc. The computer typically executes an operating system and one or more application programs. Starting the computer from a powered-down state is as simple as actuating a switch. The operating system usually loads automatically (during the "boot-up" process), and, afterwards, application programs may then be launched by the operating system or by the user. Shutting down a computer system generally entails exiting from all currently executing application programs and commanding the operating system to shut down. In most operating systems, a specific command to shut down the system is provided. Other computer systems may respond to the operation of a switch, or to a remote command received over a network. The shut down process is automatic, and, when each component of the computer system is functioning normally, application and operating system data contained within volatile memory (i.e., e.g., L1/L2/L3 caches, system RAM, etc.) may be transferred to non-volatile memory (i.e., e.g., FLASH RAM, a hard disk, etc.) as part of the process.

However, when a computer system component behaves in an anomalous manner, the shut down process may be interrupted and the system may fail to shut down, resulting in the ubiquitous "hung" computer. For example, when an application program is commanded to exit and fails to do so, the operating system may not be able to regain control of the processor. Consequently, the operating system may not be able to conclude the shut down process. Typically, the only recourse available to the user is to power down the system and attempt to restart the system from the powered-down state. Importantly, data that has not been saved from volatile memory to non-volatile memory will be permanently lost when the switch is flipped and power is removed. In other situations, an application or operating system component may "crash" or shut down "illegally," causing the computer system to halt. Some operating systems display an information screen first before halting; in these systems, the only recourse is to power down the system, or operate a processor reset button. In any case, information that was stored in volatile memory is lost.

In some computer systems, one or more removable processor boards may be housed within a system chassis. In these systems, each processor board nay have one or more processors, along with supporting circuitry, and may function either independently of, or cooperatively with, one another. However, in many systems, a processor board may be removed from the chassis without powering down the entire system. And, in many instances, the processor board is removed without first shutting down the application software and operating system executing on the processor. Or, a processor board may be removed because the processor is "hung." In either case, data that has not been saved from volatile memory on the processor board to non-volatile memory on the processor board, or, more generally, to global system memory, will be lost when the processor board is removed from the chassis.

Restarting the computer system after an interrupted shut down process may not be successful. For example, the operating system may become corrupted, i.e., critical information maintained by the operating system may not be correctly transferred from volatile memory to non-volatile memory. In this case, the operating system may fail to successfully instantiate during the subsequent start up process, thereby rendering the computer system, or processor board, inoperable. Similarly, critical, yet transient, application data may be lost, thereby corrupting other data maintained on permanent storage devices and preventing the application from subsequently restarting. However, if information relating to the cause of the malfunction, e.g., hardware, software, etc., is available during the restart process, a faster, and more confident, restart of the computer system may be facilitated.

BRIEF DESCRIPTION OF THE DRAWINGS

FIG. 3 illustrates a method for restarting a computer system, according to an embodiment of the present invention.

DETAILED DESCRIPTION

Embodiments of the present invention provide a method and system for shutting down and restarting a computer system. Activation of a mechanical switch on a removable processor board may cause a processor interrupt signal to be generated. In response, the operating mode of the processor may be switched from a first mode to a second mode. The cause of the processor interrupt may then determined, and, if the mechanical switch is the cause, then the operating mode may be switched from the second mode back to the first mode and at least one software component executing within the first mode may be notified to shut down. According to another aspect of the invention, performance information may be periodically stored in a memory. A processor interrupt signal may be generated in response to a system anomaly, and the operating mode of the processor may be switched from a first mode to a second mode. Based on the performance information, the system may be restarted, or, alternatively, a component within the system may be restarted or replaced.

Figure 1:
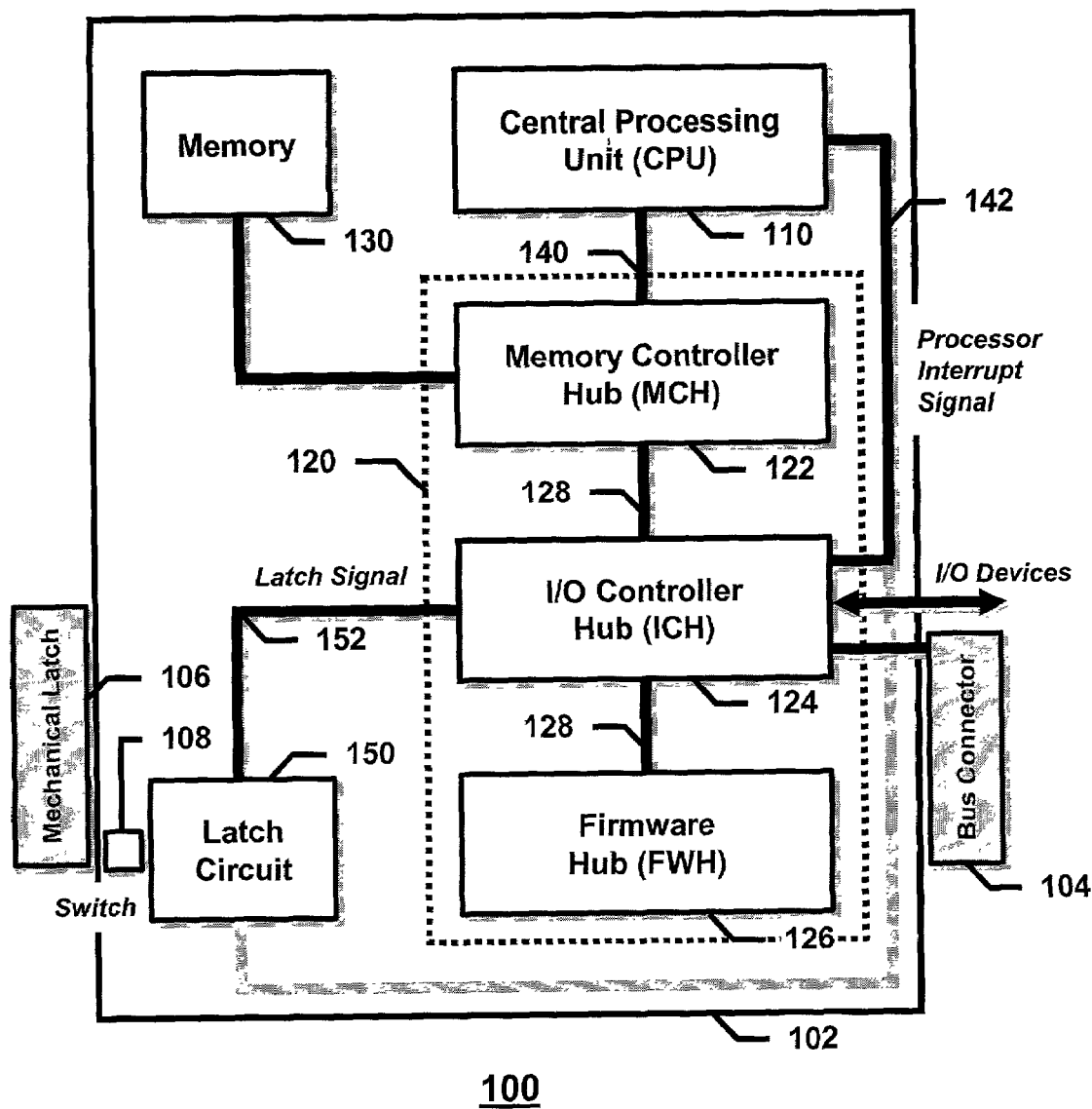
FIG. 1 is a computer system block diagram, according to an embodiment of the present invention.

FIG. 1 is a computer system block diagram according to an embodiment of the present invention. Generally, computer system 100 may include a central processing unit (CPU) or processor 110, a supporting chipset 120 which provides interfaces between processor 110 and various other elements of computer system 100, including, for example, memory 130, mass storage devices (not shown), I/O devices (not shown), etc. Processor 110 may be coupled to chipset 120 via host bus 140, as well as processor interrupt signal 142.

In one embodiment, computer system 100 may be a personal computer, such as, for example, a desktop system or portable notebook. In another embodiment, computer system 100 may be a removable processor board (RPB)

within a multiprocessor computer system, or, computer system 100 may be a single board computer (SBC) within a multi-slot card chassis having a backplane, such as, for example, a VMEbus chassis (VERSAmodule Eurocard Bus, IEEE-1014-1987). Generally, processor board 102 may represent either an RPB or an SBC, and, although memory 130 may reside on processor board 102 as shown in FIG. 1, memory 130 may also be connected to the system or backplane bus and accessed as a system resource, similar to a mass storage device. Processor board 102 may include bus connector 104 to connect the processor board to a system or backplane bus, and at least one mechanical latch 106 to secure the processor board within the computer system chassis. Mechanical latch 106 may embody many different types of well-known mechanical fastening mechanisms, including a simple latch.

A latch circuit 150 may be coupled to mechanical latch 106 to indicate whether the latch is in an open or closed state, and may include a microswitch 108. For example, the operation of mechanical latch 106, from a closed position to an open position, may activate latch circuit 150 via microswitch 108. In one embodiment, latch circuit 150 may be coupled to chipset 120 via latch signal 152, while in another embodiment, latch circuit 150 may be coupled directly to processor 110 via processor interrupt signal 142.

In one embodiment, chipset 120 may implement a Northbridge/Southbridge chip architecture, while in another embodiment, chipset 120 may implement an accelerated hub architecture. In the latter embodiment, the functionality of the traditional Northbridge and Southbridge chips is divided among three basic components, a Memory Controller Hub (MCH) 122, an I/O Controller Hub (ICH) 124, and a Firmware Hub (FWH) 126. These hubs may be connected via bus 128, which may be, for example, a high-speed, proprietary data bus. MCH 122 may be coupled to processor 110 via host bus 140, and FWH 126 may be coupled to ROM (not shown).

ICH 124 may include interfaces to several external data buses or signals, including, for example, latch signal 152 and processor interrupt signal 142. ICH 124 may also include circuitry to set a latch signal bit in a general purpose status register to indicate that latch signal 152 has been detected. The latch bit may be set to '0' to indicate that the latch signal has not been detected (e.g., a "closed" latch condition) and to '1' to indicate that the latch signal has been detected (e.g., an "open" latch condition). ICH 124 may include additional circuitry to generate processor interrupt signal 142 in response to setting the latch signal bit.

In an embodiment, processor 110 may be a microprocessor, such as, for example, a Pentium IV manufactured by Intel Corporation of Santa Clara, Calif., etc. Alternatively, processor 110 may be a microcontroller or an Application Specific Integrated Circuit (ASIC). Processor 110 may include several operating modes with varying levels of instructions, architectural features, and protection. For example, 32-bit Intel Architecture processors include a real mode, a protected mode, a system management mode (SMM), and a virtual-8086 mode.

Processor 110 may execute operating system (OS) software, such as, for example, the Windows 2000 Professional operating system manufactured by Microsoft Corporation of Redmond, Wash., etc. Processor 110 may also execute real time operating system (RTOS) software, such as, for example, the VxWorks 5 RTOS manufactured by Wind River Systems, Inc. of Alameda, Calif., etc. Or, processor 110 may execute embedded, application-specific firmware. Processor 110 may include a firmware-based operating mode (e.g., a system management mode) that executes independently of the operating system software to provide special purpose functionality at a system level, which may include, for example, power management, system hardware control, etc.

In an embodiment, processor 110 may invoke a system management mode (SMM) when a system management interrupt (SMI) is received. The interrupt handler associated with the SMI causes the processor to save the current state (i.e., the processor's current context) and switch to SMM, i.e., an operating environment having a separate address space in a protected area of memory known as system management RAM (SMRAM). While in SMM, the processor executes code and stores data in SMRAM memory space, and may perform various operations, such as, for example, power management, system hardware control, execution of proprietary code, etc. SMM code may be stored, for example, in Read Only Memory (ROM). When SMM has completed its programmed functionality, a resume (RSM) instruction may be executed to reload the previously saved processor context and "resume" execution of the interrupted application or operating system task.

SMRAM may be mapped to the physical address space of the processor, and, for a 32-bit Intel Architecture processor, may be up to 4 GBytes in size. The base physical address of SMRAM (i.e., SMBASE) may be relocatable within the system memory address space, and, consequently, may be relocated within the physical address space assigned to memory 130. In an alternative embodiment, SMBASE may be relocated to the physical address space a non-volatile memory device, such as a separate FLASH RAM device. Normally, non-SMM software applications, tasks, or drivers are precluded from accessing, i.e., reading from or writing to, SMRAM.

Processor 110 may also execute a profiling application which acquires performance profiles associated with the various components of computer system 100, including, for example, memory 130, mass storage devices, I/O devices, software processes, hardware or software interrupts, etc. Additionally, the profiling task may operate in a non-invasive manner. For example, the profiling task may operate in the background of a non-preemptive system, or the profiling task may be assigned a low priority within a preemptive, multi-tasking system. The profiling application may be allowed to store data associated with the performance of the various components within a protected area of memory, e.g., SMRAM. In an embodiment, SMRAM may be mapped to system memory 130; in this way, profiling data, acquired by the profiling application, may be accessible to code executing within SMM.

Figure 2:
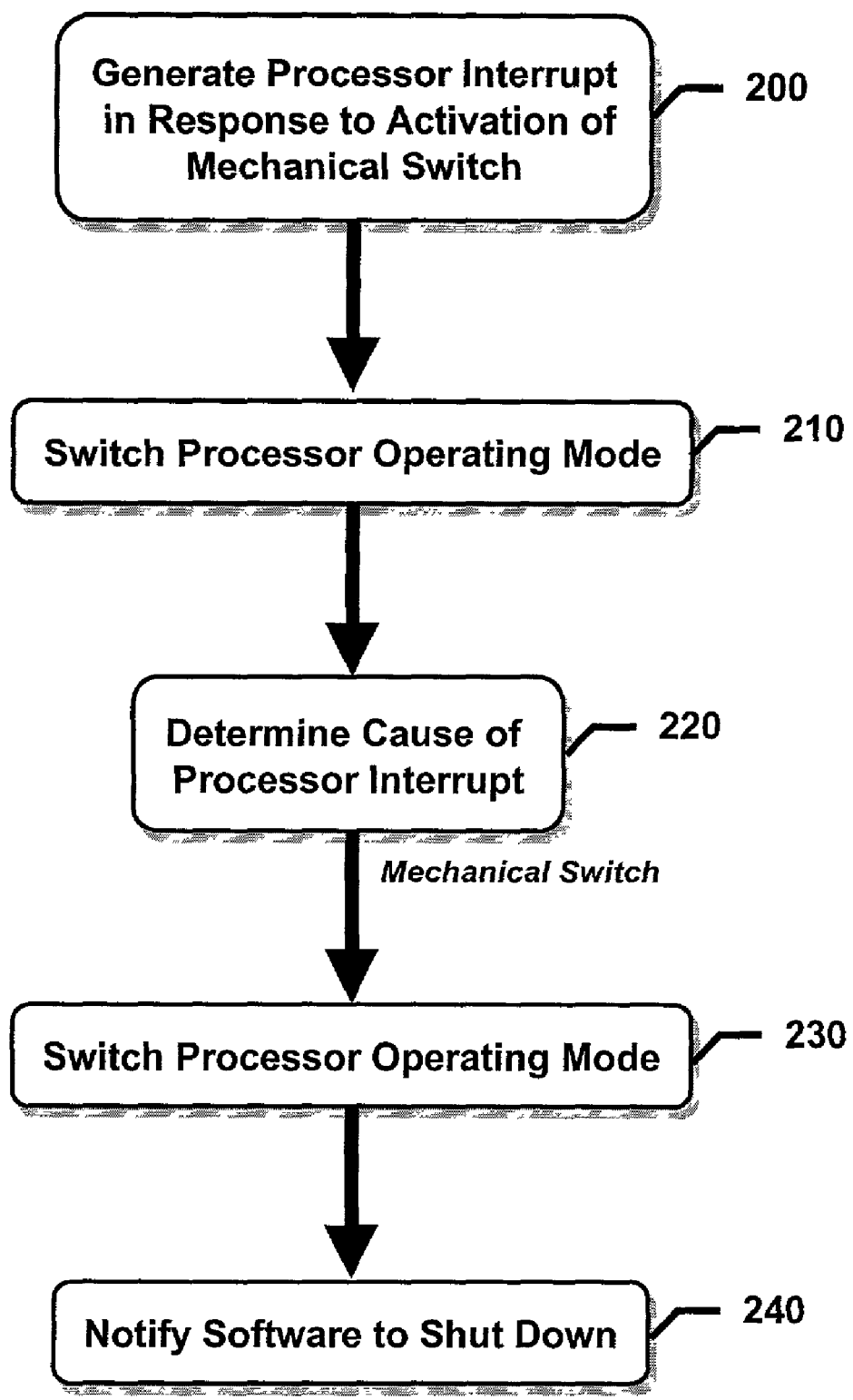
FIG. 2 illustrates a method for shutting down a computer system, according to an embodiment of the present invention.

FIG. 2 illustrates a method for shutting down a computer system, according to an embodiment of the present invention.

A processor interrupt may be generated (200) in response to the activation of a mechanical switch on a removable processor board. In one embodiment, latch circuit 150 generates processor interrupt 142 in response, while in another embodiment, latch circuit 150 generates latch signal 152 in response, which may be input to chipset 120, or alternatively, to ICH 124. Chipset 120 may then generate processor interrupt signal 142 in response. Processor interrupt signal 142 may be a system management interrupt (SMI), for example.

The processor operating mode may be switched (210) from a first operating mode to a second operating mode. For example, processor 110 may be executing operating system and application software in a protected operating mode, and, in response to processor interrupt 142, processor 110 may switch to a special-purpose operating mode. In an embodiment, processor interrupt signal 142 may be a system management interrupt which causes processor 110 to switch from real or protected mode to system management mode.

The cause of the processor interrupt may be determined (220). In one embodiment, software executing within a special-purpose operating mode may determine that latch circuit 150 generated processor interrupt 142. In another embodiment, software executing within the system management mode may query ICH 124 for the contents of the general purpose status register, and, in particular, for the value of the latch signal bit, in order to determine the cause of the system management interrupt. A value may then be written to a predetermined location in memory, accessible to software executing within both processor operating modes, to indicate that latch circuit 150 detected the activation of mechanical switch 108. For example, a shutdown flag may be set to indicate this condition. Software executing within system management mode may also save critical state information to non-volatile memory, such as, for example, retry counters, error counters, software revision level, hardware revision level, checkpoint information needed to restart an application at the last known good state, hardware errors and status registers needed for post mortem analysis, etc.

The processor operating mode may be switched (230) from the second mode back to the first mode. In one embodiment, processor 110 may switch from the system management mode back to the previous operating mode of the processor, which may be, for example, real mode, protected mode, virtual-8086 mode, etc. In another embodiment, processor 110 may switch operation from the special-purpose operating mode back to the protected operating mode. Of course, if the cause of the processor interrupt is not determined (220) to be the activation of mechanical switch 108, then other processes or interrupt routines may be executed.

Software executing within the first operating mode may be notified (240) to shut down. In an embodiment, a software process executing within the previous operating mode periodically inspects the predetermined location in memory, or, e.g., a shutdown flag, in order to determine whether a shutdown should occur. If the value is set, the software process notifies the operating system to shut down. This notification may be accomplished using an inter-process communication mechanism, such as, for example, an inter-task message or a pipeline command, or other well known inter-task communication techniques. The shutdown process may include, for example, saving critical operating system and application data to non-volatile memory, etc.

FIG. 3 illustrates a method for restarting a computer system, according to an embodiment of the present invention.

System performance information may be periodically stored (300) in a protected area of memory. In an embodiment, a profiling application may acquire and store computer system component profiling data within a memory, such as, for example, memory 130. Additionally, the profiling data may be stored within a special, protected area of memory, such as, for example, SMRAM. Profiling data may include, for example, error types encountered, number of errors encountered, fatal/non-fatal errors, count of retraining sequences tried for a data link, count of data transmission retries, hardware status registers, etc.

An interrupt signal may be generated (310) in response to a system anomaly. After a system anomaly is detected, which may be caused by various hardware or software faults including, for example, a memory leak, a rogue pointer, a software or hardware component crash, etc., processor interrupt signal 142 may be generated. In one embodiment, a counter within ICH 124 may be periodically reset by an operating system driver executing on processor 110. If the driver fails to reset the counter, for example, due to the malfunction, the counter will reach a predetermined value. Once the counter reaches the predetermined value, ICH 124 may generate processor interrupt signal 142, which may be, for example, an SMI.

A processor operating mode may be switched (320) from a first mode to a second mode in response to the interrupt signal. In an embodiment, system management mode may be invoked by processor 110 in response to the interrupt. Software executing within system management mode, for example, may then determine the cause of the interrupt.

A computer restart may be determined (330) based on the performance information. For example, if the malfunctioning component is a hardware device, for example, system management mode software may determine that computer system 100 needs to be restarted to correct the anomaly. Alternatively, system management mode software may determine that one or more software components, executing within the previous operating mode, have malfunctioned, and, in order to successfully recover from the anomaly, may determine that computer system 100 needs to be restarted to correct the anomaly.

The computer system may be restarted (340) if so determined. For example, system management mode software may send a command to an external power management device, e.g., a power controller, to cycle the power of computer system 100. In an embodiment, system management mode software may send a command to ICH 124 to cycle the power of computer system 100, processor 110, or any other hardware device.

A computer system component may be associated (350) with the system anomaly based on the performance information. System management mode software may inspect the profiling data stored in memory (e.g., SMRAM) and determine that one, or more, hardware component (e.g., processor 110, etc.) are associated with the anomaly, or, alternatively, determine that one, or more, software components are behaving abnormally. For example, data link statistics, including the number of attempts to negotiate the data rate between hardware components, the number of dropped packets of messages, etc., may be compiled and the appropriate communication link hardware, or software, components associated with the anomaly.

A component restart or replacement may be determined (360) based on the performance information. For example, if communication link end points cannot establish a link, or, alternatively, if the negotiated data rate between end points is too low to maintain a required performance level, then a related hardware component may be replaced, such as, e.g., a network interface board. For other components, a reset or restart may overcome the anomaly, such as, for example, software. In another embodiment, an iterative approach may be undertaken, in which a component reset or restart is first attempted, and if ineffective, a component replacement may then be effectuated. Processor 110 may switch from system management mode back to the previous operating mode of the processor to allow the operating system to restart or reset the software component.

The component may be restarted (360), or, alternatively, the component may be replaced (370), as discussed above. System management mode software may restart the hardware component by sending a reset command over an external bus, such as, for example, an SMBus, or, alternatively, by sending a command, to a power controller, to cycle the hardware device's power. In another embodiment, processor 110 may send a command to ICH 124 to reset, or power-cycle, the hardware device. Additionally, if the hardware device is a hard disk connected to computer system 100 using an external Firewire bus, the hard disk may be hot-swapped, i.e., replaced with a new disk without powering down computer system 100.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A computer system having a removable processor board, comprising:
    a latch circuit coupled to mechanical switch;
    a controller coupled to the latch circuit; and
    a processor coupled to the controller;
    wherein the latch circuit is responsive to the mechanical switch to generate a latch signal.

2. The computer system of claim 1, wherein the controller is responsive to the latch signal to generate an interrupt signal.

3. The computer system of claim 2, wherein the processor is responsive to the interrupt signal to:
    switch from a first operating mode to a second operating mode;
    switch from the second operating mode to the first operating mode if a cause of the interrupt signal is determined to be the mechanical switch; and
    notify at least one software component to shut down.

4. The computer system of claim 3, wherein the interrupt signal is a system management interrupt, the first operating mode is a protected mode, and the second operating mode is a system management mode.

5. A method for shutting down a computer system having a removable processor board, comprising:
    generating a processor interrupt in response to an activation of a mechanical switch;
    switching the processor from a first operating mode to a second operating mode in response to the processor interrupt;
    determining a cause of the processor interrupt;
    switching the processor from the second operating mode to the first operating mode; and
    notifying a software component executing within the first operating mode to shut down;
    wherein said notifying includes a message to the software component.

6. The method of claim 5, further comprising:
    generating a latch signal in response to the activation of the mechanical switch; and
    generating the processor interrupt in response to the latch signal.

7. The method of claim 5, wherein the processor interrupt is a system management interrupt, the first operating mode is a protected mode, and the second operating mode is a system management mode.

8. The method of claim 5, wherein said notifying includes writing a value to a location in memory.

9. The method of claim 5, wherein the first operating mode executes an operating system and the software component is an application program.

10. A method for restarting a computer system having a processor and a memory, comprising:
    periodically storing system performance information in a memory;
    generating a processor interrupt in response to a system anomaly, said processor interrupt is a system management interrupt;
    switching the processor from a first operating mode to a second operating mode in response to the processor interrupt, said first operating mode is a protected mode and said second operating mode is a system management mode;
    determining whether to restart the computer system based on the performance information; and
    restarting the computer system if so determined.

11. The method of claim 10, further comprising:
    associating at least one component of the computer system with the system anomaly based on the performance information;
    determining whether to replace the component; and
    replacing the component if so determined.

12. The method of claim 11, wherein the component is a hardware device.

13. The method of claim 11, wherein the component is a removable processor board.

14. The method of claim 10, further comprising:
    associating at least one component of the computer system with the system anomaly based on the performance information;
    determining whether to restart the component; and restarting the component if so determined.

15. The method of claim 14, wherein the component is the processor.

16. The method of claim 14, wherein the component is a software process executing within the first operating mode.

17. The method of claim 14, wherein the component is a software process and said restarting the component includes:
    switching from the second operating mode to the first operating mode; and
    notifying an operating system executing within the context of the first operating mode to restart the software process.

* * * * *